United States Patent
Kalgaonkar et al.

(10) Patent No.: US 10,266,748 B2
(45) Date of Patent: Apr. 23, 2019

(54) PLUGGING AND SEALING SUBTERRANEAN FORMATIONS

(71) Applicant: Saudi Arabian Oil Company, Dhahran (SA)

(72) Inventors: Rajendra Arunkumar Kalgaonkar, Abqaiq (SA); Vikrant Bhavanishankar Wagle, Abqaiq (SA); Jin Huang, Dhahran (SA); Abdullah Saleh Hussain Al-Yami, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/039,698

(22) Filed: Jul. 19, 2018

(65) Prior Publication Data
US 2018/0327649 A1 Nov. 15, 2018

Related U.S. Application Data

(62) Division of application No. 15/584,669, filed on May 2, 2017, now Pat. No. 10,053,613.

(51) Int. Cl.
| | | |
|---|---|---|
| C09K 8/508 | (2006.01) | |
| C09K 8/42 | (2006.01) | |
| C04B 28/24 | (2006.01) | |
| C09K 8/504 | (2006.01) | |
| C09K 8/03 | (2006.01) | |
| C09K 8/035 | (2006.01) | |
| C09K 8/54 | (2006.01) | |

(52) U.S. Cl.
CPC .............. *C09K 8/508* (2013.01); *C04B 28/24* (2013.01); *C09K 8/032* (2013.01); *C09K 8/035* (2013.01); *C09K 8/426* (2013.01); *C09K 8/5045* (2013.01); *C09K 8/54* (2013.01); *C09K 2208/10* (2013.01)

(58) Field of Classification Search
CPC ........ C09K 8/508; C09K 8/032; C09K 8/035; C09K 8/54
USPC ....................................................... 524/200
See application file for complete search history.

(56) References Cited

U.S. PATENT DOCUMENTS

| | | |
|---|---|---|
| 3,708,428 A | 1/1973 | McDonald |
| 3,713,489 A | 1/1973 | Fast et al. |
| 4,732,213 A | 3/1988 | Bennett et al. |
| 5,320,171 A | 6/1994 | Laramay |
| 7,013,973 B2 | 3/2006 | Danican et al. |
| 7,458,424 B2 | 12/2008 | Odeh et al. |
| 7,854,277 B2 | 12/2010 | Duncum et al. |
| 7,934,557 B2 | 5/2011 | Nguyen |
| 7,954,549 B2 | 6/2011 | Lende et al. |
| 8,132,623 B2 | 3/2012 | Allin et al. |
| 9,045,965 B2 | 6/2015 | Patil et al. |
| 9,133,386 B2 | 9/2015 | Kumar et al. |
| 2008/0035343 A1 | 2/2008 | Odeh et al. |
| 2011/0094746 A1* | 4/2011 | Allison ............ C09K 8/40 166/308.5 |
| 2014/0158354 A1 | 6/2014 | Kumar et al. |
| 2015/0322328 A1 | 11/2015 | Boul et al. |
| 2015/0344765 A1 | 12/2015 | Kumar et al. |

FOREIGN PATENT DOCUMENTS

WO 03/033618 4/2003

OTHER PUBLICATIONS

International Search Report and Written Opinion issued in International Application No. PCT/US2018/028843 dated Jun. 15, 2018, 16 pages.
International Search Report and Written Opinion issued in International Application No. PCT/US2018/029339 dated Jun. 15, 2018, 16 pages.

* cited by examiner

*Primary Examiner* — Hui H Chin
(74) *Attorney, Agent, or Firm* — Fish & Richardson P.C.

(57) ABSTRACT

A subterranean formation sealant includes a mixture of an aqueous colloidal dispersion including silica nanoparticles and a C6-C12 fatty acid. Heating the sealant above 70° C. initiates gelation of the sealant. Sealing an opening in a water or gas producing zone in a subterranean formation includes providing a sealant including a mixture of a colloidal dispersion including silica nanoparticles and a C6-C12 fatty acid to the water or gas producing zone, initiating gelation of the sealant in situ, and solidifying the sealant in the water or gas producing zone to yield a set gel, thereby sealing the opening in the water or gas producing zone.

10 Claims, 2 Drawing Sheets

PLUGGING AND SEALING SUBTERRANEAN FORMATIONS

CROSS-REFERENCE TO RELATED APPLICATION(S)

This application is a divisional of and claims the benefit of priority to U.S. patent application Ser. No. 15/584,669, filed on May 2, 2017, the contents of which are hereby incorporated by reference.

TECHNICAL FIELD

This document relates to methods and compositions for plugging and sealing unwanted water and gas producing zones in subterranean formations.

BACKGROUND

Excessive water production greatly affects the economic life of producing wells. High water cut largely affects the economic life of producing wells and may be responsible for oil field related damage mechanisms, such as scale deposition, fines migration, asphaltene precipitation, corrosion, and the like, leading to increased operating costs for separating, treating, and disposing of the produced water according to environmental regulations. Though a variety of chemicals are used by the industry to control water production, many are not environmentally acceptable in regions with strict environmental regulations.

SUMMARY

In a first general aspect, a subterranean formation sealant includes a mixture of an aqueous colloidal dispersion including silica nanoparticles and a C6-C12 fatty acid. Heating the sealant above 70° C. initiates gelation of the sealant.

In a second general aspect, sealing an opening in a water or gas producing zone in a subterranean formation includes providing a sealant including a mixture of a colloidal dispersion including silica nanoparticles and a C6-C12 fatty acid to the water or gas producing zone, initiating gelation of the sealant in situ, and solidifying the sealant in the water or gas producing zone to yield a set gel, thereby sealing the opening in the water or gas producing zone.

Implementations of the first and second general aspect may include one or more of the following features.

A viscosity of the sealant at 20° C. is typically less than 5 cP. A pH of the sealant is in a range of 1 to 6.

The colloidal dispersion includes at least one of a salt and a water-miscible organic solvent. A size of the silica nanoparticles is in a range of 1 nm to 500 nm. A concentration of the silica nanoparticles in the colloidal dispersion is in a range of 10 wt % to 50 wt %. A pH of the aqueous colloidal dispersion is in a range of 8 to 11.

A ratio of the C6-C12 fatty acid to the colloidal dispersion is typically in a range of 0.25 vol % to 5 vol %. The C6-C12 fatty acid includes, consists essentially of, or consists of C6-C8 fatty acid. The C6-C8 fatty acid typically includes one or more of hexanoic acid, heptanoic acid, and octanoic acid.

Implementations of the second general aspect may include one or more of the following features.

Initiating gelation may include heating the sealant in situ. Heating the sealant in situ may include heating the sealant via conduction or convection with heat contained in the subterranean formation.

The opening is a bottom water coning or cresting, a channel behind a casing, a channel from an injector, a cross flow, or a natural fracture.

In some implementations, the second general aspect includes decreasing a pH of the sealant to accelerate the gelation of the sealant. In some implementations, the second general aspect includes increasing a temperature of the sealant to accelerate the gelation of the sealant. Some implementations of the second general aspect include increasing a concentration of the silica nanoparticles in the sealant or a concentration of the C6-C12 fatty acid in the sealant to accelerate the gelation of the sealant.

The disclosed sealant is advantageously water-based and includes environmentally acceptable components. The silica nanoparticles are environmentally benign, and the C6-C12 fatty acid is biodegradable and environmentally acceptable. In addition, the gelation time of the disclosed sealant can be advantageously controlled by, for example, adjusting the concentration of the C6-C12 fatty acid, allowing a predictable and controllable pumping time ranging from a few minutes to several hours at a given temperature. Thus, the sealant remains pumpable for a sufficient length of time for placement and develops the network structure that leads to gelation over a predictable length of time. The set gel, which appears as a crystalline solid, advantageously remains homogeneous and remains in place under confined conditions, such as fractures and pore spaces.

DETAILED DESCRIPTION

Figure 1:
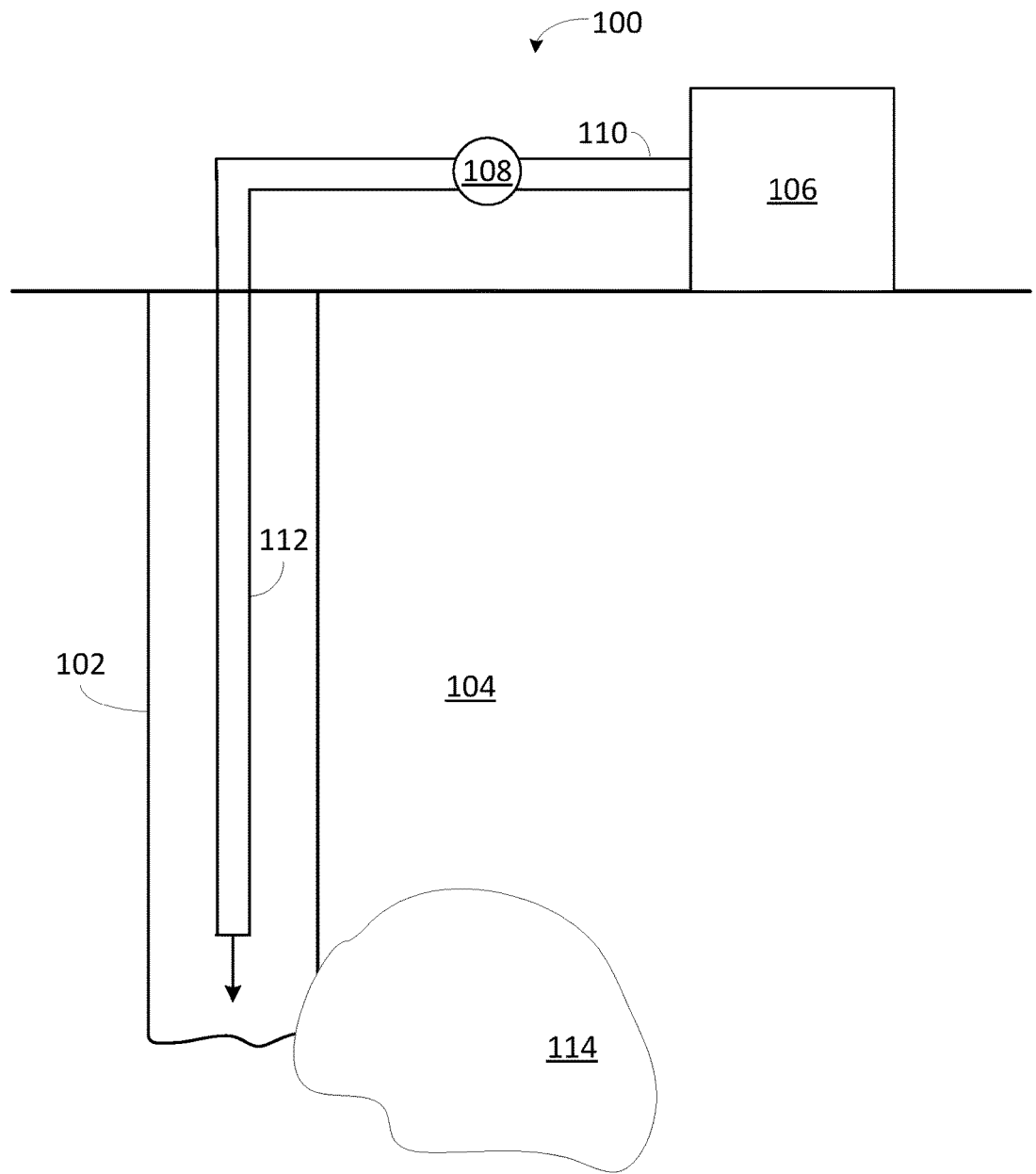
FIG. 1 depicts an exemplary system for delivering fluid to a borehole in a subterranean formation.

FIG. 1 depicts exemplary system 100 for delivering fluid to borehole 102 in subterranean formation 104. In some embodiments, borehole 102 is a wellbore. Fluid from source 106 is pumped via pump 108 through line 110 and enters borehole 102 through pipe 112. The fluid may be a sealant provided to subterranean formation 104 via pipe 112 to plug or seal water or gas producing zone 114. The water or gas producing zone to be sealed may be referred to as a "target zone." The sealant may be placed as a single solution into the water bearing zones of subterranean formation 104 around wellbore 102, and allowed to propagate through the rock matrix. The sealant may be a low viscosity solution. In one embodiment, a viscosity of the sealant is less than 5 cP at 20° C. In one example, sealant provided to subterranean formation 104 via system 100 effectively prevents water flow in sandstone and carbonate formations at temperatures in a range of 70° C. to 150° C. An initial low viscosity of the sealant allows for low injection pressures.

The sealant includes a mixture of a colloidal dispersion comprising metal oxide nanoparticles and an activator. The metal oxide nanoparticles may be silica nanoparticles. The activator is a C6-C12 fatty acid or a mixture thereof. In some embodiments, the fatty acid includes, consists essentially or, or consists of at least one of hexanoic acid, heptanoic acid, octanoic acid, nonanoic acid, decanoic acid, undecanoic acid, and dodecanoic acid. In certain embodiments, the fatty acid includes, consists essentially of, or consists of at least one of hexanoic acid, heptanoic acid, and octanoic acid.

Silica nanoparticles are environmentally benign, and C6-C12 fatty acid is biodegradable and environmentally acceptable.

The silica nanoparticles in the colloidal dispersion have a size in a range of 1 nm to 500 nm. A smaller particle size of the silica nanoparticles typically promotes faster gelling of the sealant. A concentration of the silica nanoparticles in the colloidal dispersion is in a range of 10 wt % to 50 wt %. A higher concentration of the silica nanoparticles typically promotes faster gelling of the sealant. In some embodiments, the colloidal dispersion includes a salt. Examples of suitable salts include sodium chloride, potassium chloride, calcium chloride, sodium bromide, calcium bromide, sodium formate, potassium formate, cesium formate, and mixtures thereof. In some embodiments, the colloidal dispersion includes a water-miscible organic solvent. Examples of suitable water-miscible organic solvents include but not limited to methanol, ethanol, propanol, butanol, ethyl acetate, dimethyl sulfoxide, dimethyl formamide, acetone, and mixtures thereof. The total concentration of silica in the colloidal dispersion is 10 wt % to 50 wt %. A pH of the colloidal dispersion is typically in a range of 8 to 11.

When the pH of the colloidal dispersion is at least 8, the colloidal dispersion typically remains in liquid form, with electrical repulsion between charged particles stabilizing the dispersion. Disturbing the charge balance of the colloidal dispersion may cause the silica nanoparticles to aggregate, resulting in the formation of a gel before the C6-C12 fatty acid is combined with the colloidal dispersion. Disturbing the charge balance may include at least one of: removing water from the colloidal dispersion, changing the pH of the colloidal dispersion, adding a salt to the colloidal dispersion, and adding a water-miscible organic solvent to the dispersion. Examples of suitable salts include sodium chloride, potassium chloride, calcium chloride, sodium bromide, calcium bromide, sodium formate, potassium formate, cesium formate, and mixtures thereof. Examples of suitable water-miscible organic solvents include methanol, ethanol, propanol, butanol, ethyl acetate, dimethyl sulfoxide, dimethyl formamide, acetone, and mixtures thereof.

The C6-C12 fatty acid is a liquid at room temperature and includes at least one of hexanoic acid, heptanoic acid, and octanoic acid. These fatty acids can lower the pH of the colloidal dispersion and hence cause gelation. A ratio of the C6-C12 fatty acid to the colloidal dispersion is in a range of 0.25 vol % to 5 vol %. Increasing a concentration of the C6-C12 fatty acid in the sealant typically promotes faster gelling of the sealant.

The colloidal dispersion and the C6-C12 fatty acid are combined to yield the sealant. The sealant typically has a viscosity in a range of 1 cP to 1000 cP or 1 cP to 5 cP at a temperature of 20° C. Concentration of the colloidal dispersion, the C6-C12 fatty acid, or both may be varied as needed for particular applications. In one example, increasing a viscosity of the sealant may facilitate placement of the sealant and control of its location, as well as provide viscous diversion to cover longer intervals.

Combining the colloidal dispersion and the C6-C12 fatty acid reduces the pH of the colloidal dispersion from at least 8 to below 8. In some embodiments, decreasing the pH of the colloidal dispersion from at least 8 to below 8 initiates gelation of the sealant when the temperature of the sealant is in a range of 5° C. to 300° C. In some embodiments, gelation is initiated due at least in part to the formation temperature, and an increase in the temperature of the sealant that occurs in the formation due to the formation temperature. Thus, in situ gelation occurs, via conduction or convection with heat contained in the subterranean formation, thereby sealing an opening in a water or gas producing zone in the subterranean formation.

Gelation is believed to occur at least in part as a result of collision of the silica nanoparticles, which aggregate into long chain-like networks, forming a gel. Collision of the silica nanoparticles is increased by reduction in pH of the colloidal dispersion, an increase in temperature of the sealant, or both. Not to be bound by theory, it is believed that collision of the silica nanoparticles results in the formation of siloxane bonds (Si—O—Si) between silica nanoparticles. The formation of siloxane bonds may be catalyzed by the presence of hydroxide ions. Gelation results in the formation of a set gel when aggregate formation is complete, yielding uniform three-dimensional networks of long, bead-like strings of silica nanoparticles.

Gelation may occur during static aging of the sealant. In some embodiments, gelation of the sealant is accelerated by decreasing the pH of the sealant. Typically, the more acidic the pH of the sealant, the faster gelation occurs. In some embodiments, the gelation of the sealant is accelerated by increasing the temperature of the sealant. The temperature of the sealant during gelation may be in a range of 5° C. to 300° C., 5° C. to 250° C., or 5° C. to 200° C. In some embodiments, the gelation of the sealant is accelerated by increasing the concentration of C6-C12 fatty acid in the sealant. The sealant can be solidified in a wellbore over a length of time as gelation progresses, advantageously allowing the sealant to remain pumpable for a sufficient and predictable length of time ranging from about 30 minutes to about 48 hours at a given temperature, while a network structure develops.

Gelation of the sealant yields a set gel in the form of a solid gel or a semi-solid gel. In some embodiments, the set gel is in the form of a solid crystalline material. The length of time between initiation of gelation and formation of the set gel depends at least in part on the pH of the sealant, the temperature of the sealant, the concentration of silica nanoparticles in the colloidal dispersion, and the ratio of C6-C12 fatty acid to the silica nanoparticles. A set gel may function as an efficient conformance product for plugging and sealing an opening such as a bottom water coning or cresting, a channel behind a casing, a channel from an injector, a cross flow, or a natural fracture. The set gel remains as a semi-solid gel or solid gel in the opening, thereby reducing production of unwanted water or gas. In some embodiments, the set gel effectively prevents water and gas flow in sandstone formations at 70° C. to 150° C. In some embodiments, the set gel is stable indefinitely at a temperature in a range of 5° C. to 200° C. In certain embodiments, the set gel is stable essentially indefinitely at a temperature up to 260° C. No precipitation of the silica nanoparticles is observed during gel formation or at elevated temperatures.

Figure 2:
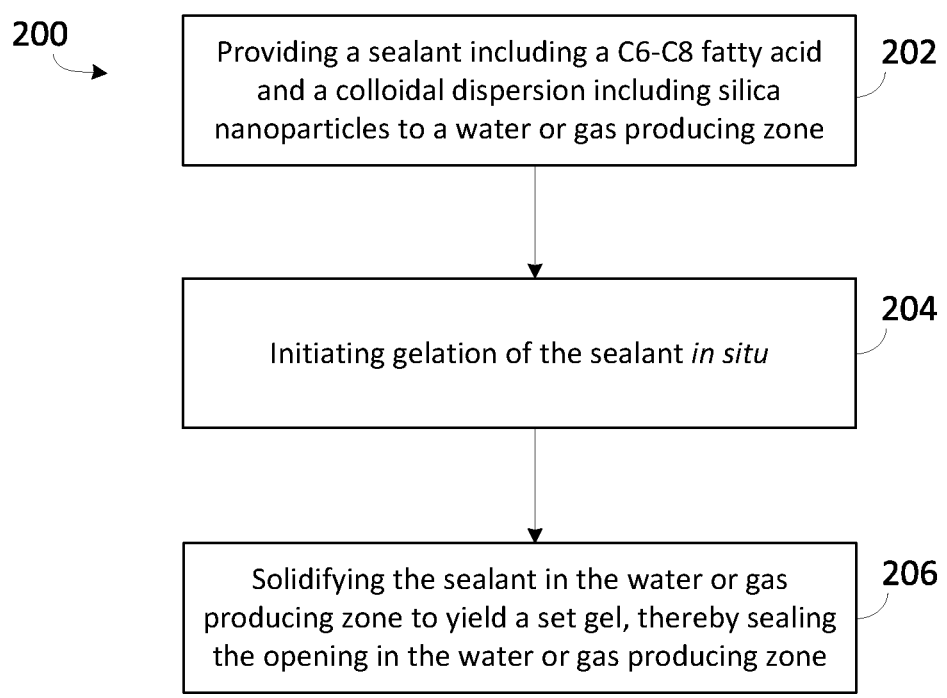
FIG. 2 is a flowchart showing operations in an exemplary process for sealing an opening in a water or gas producing zone in a subterranean formation.

FIG. 2 is a flowchart showing operations in an exemplary process for sealing an opening in a water or gas producing zone in a subterranean formation. The opening may be a bottom water coning or cresting, a channel behind a casing, a channel from an injector, a cross flow, or a natural fracture. In 202, a sealant including a mixture of a colloidal dispersion and C6-C12 fatty acid is provided to the water or gas producing zone. The colloidal dispersion includes silica nanoparticles. In 204, gelation of the sealant is initiated in situ. In 206, the sealant is solidified in the water or gas producing zone to yield a set gel, thereby sealing the opening in the water or gas producing zone. In some embodiments, an order of the operations in process 200 may be altered. In some embodiments, operations in process 200 may be omitted or added.

In some embodiments of process 200, initiating gelation includes heating the sealant in situ. Heating the sealant in situ includes heating the sealant via conduction or convection with heat contained in the subterranean formation. Gelation of the sealant may be accelerated by decreasing a pH of the sealant, increasing a temperature of the sealant, increasing a concentration of the silica nanoparticles in the sealant, or increasing a concentration of the C6-C12 fatty acid in the sealant. The set gel may be in the form of a solid gel or a semi-solid gel. A set gel in the form of a solid gel may have the appearance of a crystalline solid. The set gel may effectively prevent water and gas flow in sandstone and carbonate formations at a temperature in a range of 70° C. to 150° C.

EXAMPLE 2 mL of SABIC FATTY ACID C6-C8 (available from SABIC Chemicals) was combined with 100 mL of an alkaline, aqueous colloidal dispersion of silica nanoparticles (IDISIL SI 4545, available from Evonik Industries), and the dispersion was mixed well with a stirrer. SABIC FATTY ACID C6-C8 includes a mixture of 35-45% hexanoic acid and 55-65% octanoic fatty acid. Table 1 lists properties of IDISIL SI 4545.

TABLE 1

Properties of IDISIL SI 4545

| Product | Particle size titrated (nm) | % $SiO_2$ | pH (25° C.) | Specific gravity (g/mL) | Visual appearance |
|---|---|---|---|---|---|
| IDISIL SI 4545 | 45 | 45 | 11 | 1.32 | white/off-white |

Other suitable colloidal dispersions include CEMBINDER 17 and CEMBINDER 50, available from AkzoNobel. Properties of CEMBINDER 17 and CEMBINDER 50 are listed in Table 2.

TABLE 2

Properties of CEMBINDER 17 and CEMBINDER 50

| Product | $SiO_2$ (wt %) | $Na_2O$ (wt %) | pH | Viscosity (cP) | Density (gm/cm³) | Average size (nm) |
|---|---|---|---|---|---|---|
| CEMBINDER 50 | 15% | 0.4% | ~10 | 3.0 | 1.1 | 5 |
| CEMBINDER 17 | 40% | 0.3% | ~9.4 | 6.0 | 1.1 | 17 |

The resulting sealant was then subjected to static aging at 120° C. for 16 hours. Gelation resulted in a set gel after 16 hours of static aging. The set gel was a solid gel having the appearance of a crystalline solid.

Definitions

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise. The term "about" can allow for a degree of variability in a value or range, for example, within 10%, within 5%, or within 1% of a stated value or of a stated limit of a range.

The term "fluid" refers to gases, liquids, gels, slurries with a high solids content, and critical and supercritical materials.

The term "sealant" refers to a material provided to a wellbore or subterranean formation that inhibits or prevents flow of a fluid between two locations, such as between portions of a wellbore, between portions of a subterranean formation, between a portion of a wellbore and a portion of a subterranean formation, or between a portion of a wellbore and a portion of a tubular string in the wellbore.

The term "subterranean formation" refers to any material under the surface of the earth, including under the surface of the bottom of the ocean. For example, a subterranean formation can be any section of a wellbore and any section of a subterranean petroleum- or water-producing formation or region in fluid contact with the wellbore. In some examples, a subterranean formation can be any below-ground region that can produce liquid or gaseous petroleum materials, water, or any section below-ground in fluid contact therewith. For example, a subterranean formation can be at least one of an area desired to be fractured, a fracture, or an area surrounding a fracture, and a flow pathway or an area surrounding a flow pathway, where a fracture or a flow pathway can be optionally fluidly connected to a subterranean petroleum- or water-producing region, directly or through one or more fractures or flow pathways.

OTHER EMBODIMENTS

It is to be understood that while embodiments have been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of sealing an opening in a water or gas producing zone in a subterranean formation, the method comprising:
   providing a sealant comprising a mixture of a colloidal dispersion comprising silica nanoparticles and a C6-C12 fatty acid to the water or gas producing zone;
   initiating gelation of the sealant in situ; and solidifying the sealant in the water or gas producing zone to yield a set gel, thereby sealing the opening in the water or gas producing zone.

2. The method of claim 1, wherein initiating gelation comprises heating the sealant in situ.

3. The method of claim 2, wherein heating the sealant in situ comprises heating the sealant via conduction or convection with heat contained in the subterranean formation.

4. The method of claim 1, wherein the opening is a bottom water coning or cresting, a channel behind a casing, a channel from an injector, a cross flow, or a natural fracture.

5. The method of claim 1, comprising decreasing a pH of the sealant to accelerate the gelation of the sealant.

6. The method of claim 1, comprising increasing a temperature of the sealant to accelerate the gelation of the sealant.

7. The method of claim 1, comprising increasing a concentration of the silica nanoparticles in the sealant or a concentration of the C6-C12 fatty acid in the sealant to accelerate the gelation of the sealant.

8. The method of claim 1, wherein the set gel is in the form of a solid gel or semi-solid gel.

9. The method of claim 8, wherein the set gel is in the form of a solid crystalline material.

10. The method of claim 1, wherein the set gel effectively prevents water and gas flow in sandstone and carbonate formations at a temperature in a range of 70° C. to 150° C.

* * * * *